(12) United States Patent  (10) Patent No.: US 9,424,158 B2
Cai  (45) Date of Patent: Aug. 23, 2016

(54) SERVER SYSTEM WITH SIGNAL MATCHING FUNCTIONALITY

(71) Applicants: Inventec (Pudong) Technology Corporation, Shanghai (CN); INVENTEC CORPORATION, Taipei (TW)

(72) Inventor: Yu-Sheng Cai, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 315 days.

(21) Appl. No.: 14/080,515

(22) Filed: Nov. 14, 2013

(65) Prior Publication Data

US 2014/0317457 A1 Oct. 23, 2014

(30) Foreign Application Priority Data

Apr. 23, 2013 (CN) .......................... 2013 1 0142930

(51) Int. Cl.
*G06F 11/00* (2006.01)
*G06F 11/32* (2006.01)

(52) U.S. Cl.
CPC ............ *G06F 11/327* (2013.01); *G06F 11/321* (2013.01)

(58) Field of Classification Search
CPC ............ G06F 11/0745; G06F 11/3041; G06F 11/3051; G06F 11/3031
USPC ..................................... 714/43, 51
See application file for complete search history.

(56) References Cited

U.S. PATENT DOCUMENTS

| | | | | |
|---|---|---|---|---|
| 7,594,144 B2 * | 9/2009 | Brandyberry | ....... | G06F 11/0787 714/34 |
| 7,861,110 B2 * | 12/2010 | Haley | .................. | G06F 11/2007 714/4.1 |
| 8,381,034 B2 * | 2/2013 | Chen | .................... | G06F 11/2284 713/1 |
| 2005/0246568 A1 * | 11/2005 | Davies | ................ | G06F 11/0709 714/2 |
| 2007/0240019 A1 * | 10/2007 | Brady | .................. | G06F 13/4291 714/43 |
| 2008/0126852 A1 * | 5/2008 | Brandyberry | ....... | G06F 11/0787 714/6.13 |
| 2012/0110389 A1 * | 5/2012 | Chen | .................... | G06F 11/3034 714/47.1 |
| 2012/0133520 A1 * | 5/2012 | Chang | .................... | G08B 21/00 340/635 |
| 2012/0144245 A1 * | 6/2012 | Fan | ...................... | G06F 11/0787 714/43 |
| 2013/0173952 A1 * | 7/2013 | Gao | ........................ | G06F 9/4406 714/3 |

* cited by examiner

*Primary Examiner* — Elmira Mehrmanesh
(74) *Attorney, Agent, or Firm* — Locke Lord LLP; Tim Tingkang Xia, Esq.

(57) ABSTRACT

A server system includes at least one server and a server cabinet. The at least one server includes a first connection port and a baseboard management controller which detects a connection state of the first connection port and according to the connection state, outputs a data signal or a warning signal. The server cabinet includes chambers for containing the at least one server, and the chamber includes a second connection port and a storage unit. The storage unit stores data. When the connection state specifies that the first connection port couples to the second connection port, the baseboard management controller reads the data stored in the storage unit, to output the data signal. When the connection state specifies that the first connection port does not couple to the second connection port, the baseboard management controller outputs the warning signal.

9 Claims, 1 Drawing Sheet

SERVER SYSTEM WITH SIGNAL MATCHING FUNCTIONALITY

CROSS-REFERENCE TO RELATED APPLICATIONS

This non-provisional application claims priority under 35 U.S.C. §119(a) on Patent Application No(s). 201310142930.6 filed in China on Apr. 23, 2013, the entire contents of which are hereby incorporated by reference.

BACKGROUND OF THE INVENTION

1. Technical Field of the Invention

The disclosure relates to a server system, more particularly to a server system capable of efficiently detecting a connection state of a server and increasing the efficiency of the server.

2. Description of the Related Art

In this Internet age, server for accessing the Internet plays a very important role, and its demand becomes more than before with the widely-used network. Take vertical type servers as an example. Because the vertical type server has big volume, if a company would like to dispose many vertical type servers, server hosts for respectively containing these servers would occupy a lot of space. Thus, it requires a rack to combine these server hosts, so as to manage these servers. Such a rack containing servers is a so-called server system.

In general, most conventional server systems cannot detect the current connection state between the servers and the rack thereof. Once the connection between one server and its rack is floating or cut off, the connection error will not be able to be known and dealt with in real time. This reduces the efficiency of the server system.

SUMMARY OF THE INVENTION

According to an embodiment of the disclosure, a server system includes at least one server and a server cabinet. The at least one server includes a first connection port and a baseboard management controller (BMC). The BMC couples to the first connection port, detects a connection state of the first connection port, and according to the connection state, outputs a data signal or a warning signal. The server cabinet includes chambers for containing the at least one server, and each of the chambers includes a second connection port and a storage unit. The storage unit couples to the second connection port and stores data. When the connection state specifies that the first connection port couples to the second connection port, a circuit loop is formed between the BMC and the storage unit and has a loop signal flowing therein, and the BMC reads the data stored in the storage unit, to output the data signal according to the loop signal. When the connection state specifies that the first connection port does not couple to the second connection port, the BMC outputs the warning signal.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
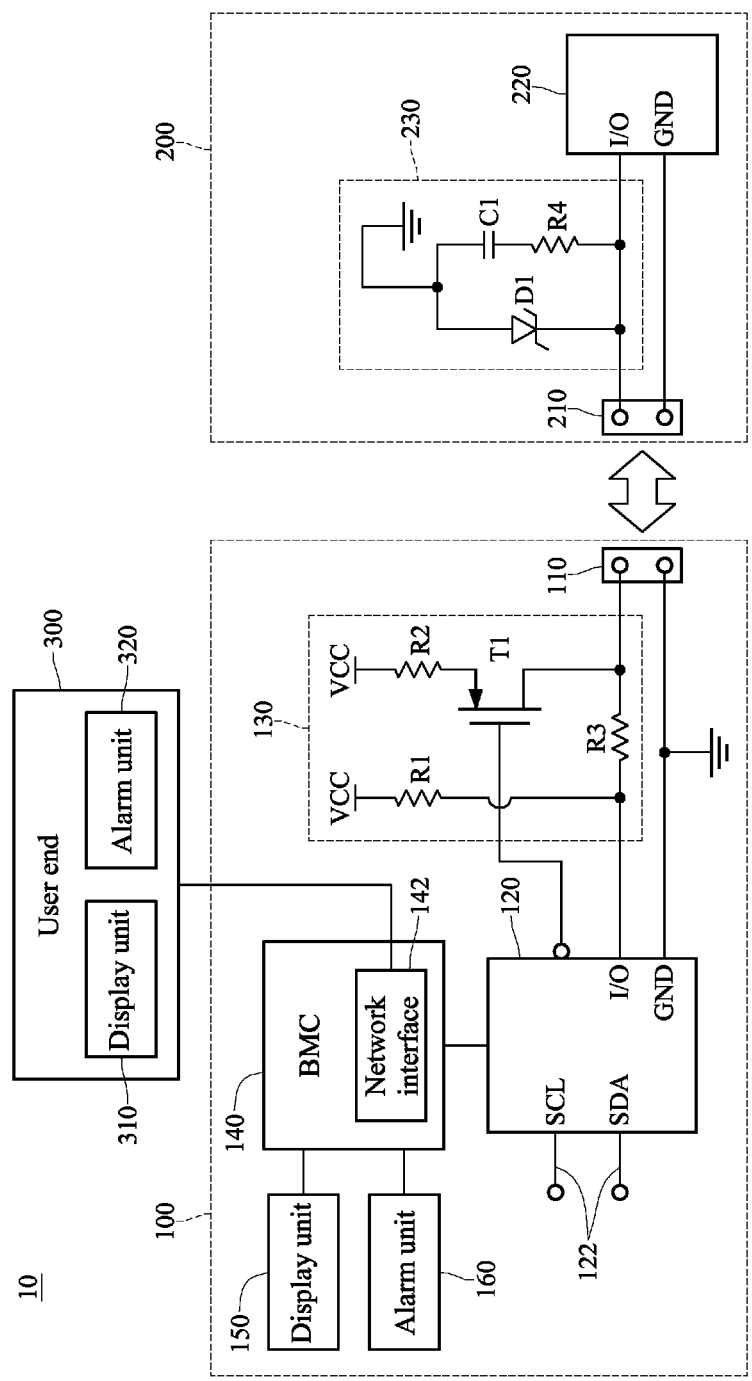
FIG. 1 is schematic diagram of a server system in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is schematic diagram of a server system in the disclosure. A server system 10 includes at least one server 100 and a server cabinet 200. For example, the server cabinet 200 can be a rack. The quantity of the at least one server 100 can be one or more in this and some embodiments, and for clearly describing the disclosure, one server 100 will be taken as an exemplary embodiment hereinafter. The server 100 includes a first connection port 110 and a BMC 140.

The BMC 140 couples to the first connection port 110, and detects a connection state of the first connection port 110 to output a data signal or a warning signal. This connection state specifies whether the first connection port 110 couples to the server cabinet 200.

The server 100 further includes a display unit 150 and an alarm unit 160. The display unit 150 couples to the BMC 140 and receives and displays the data signal. The alarm unit 160 couples to the BMC 140 and receives the warning signal to output an alarm. In this and some embodiments, the display unit 150 can be a liquid crystal displayer (LCD) or other similar components, and the alarm unit 160 can be a buzzer or a light emitting diode (LED) or other components.

Moreover, the server system 10 further comprises a user end 300. The user end 300 couples to the server system 10 through a network interface 142 of the BMC 140. The user end 300 includes a display unit 310 and an alarm unit 320. The display unit 310 couples to the network interface 142 and receives and displays the data signal. The alarm unit 320 couples to the network interface 142 and receives the warning signal to output an alarm. In this and some embodiments, the display unit 310 can be a LCD or other similar components, and the alarm unit 320 can be a buzzer or a LED or other similar components.

The server cabinet 200 in this and some embodiments can include one or more chambers for containing the at least one server 100, and one server 100 is paired with one chamber. For clearly illustrating the disclosure, one chamber will be taken as an exemplary embodiment hereinafter. The chamber includes a second connection port 210 and a storage unit 220. The storage unit 220 couples to the second connection port 210 to store data. The data stored in the storage unit 220 in this and some embodiments can include identification codes, and the storage unit 220 can be an erasable programmable read only memory (EEPROM) or other similar components.

In this and some embodiments, the server 100 can further include a conversion unit 120 coupled between the first connection port 110 and the BMC 140. The conversion unit 120 performs signal matching between the BMC 140 and the storage unit 220. For example, the conversion unit 120 is a network bridge which can perform the communication protocol conversion between the BMC 140 and the storage unit 220 when the first connection port 110 couples to the second connection port 210.

In this and some embodiments, the server 100 further includes a driving unit 130 coupled between the first connection port 110 and the conversion unit 120. The driving unit 130 receives a driving signal outputted by the conversion unit 120, to output a current signal to power the storage unit 220.

Specifically, the driving unit 130 includes a first resistor R1, a second resistor R2, a transistor T1 and a third resistor R3. The first resistor R1 has a first end and a second end, the first end of the first resistor R1 is supplied with a voltage VCC, and the second end of the first resistor R1 couples to the conversion unit 120. For example, the voltage VCC can be P3V3_STBY. The second resistor R2 has a first end and a second end, and the first end of the second resistor R2 is supplied with the voltage VCC. The transistor T1 has a first end, a second end and a third end, the first end of the transistor Ti couples to the conversion unit 120, the second end of the transistor T1 couples to the second end of the second resistor R2, and the third end of the transistor T1 couples to the first connection port 110. In this and some embodiments, the transistor T1 can be a P type metal oxide semiconductor field effect transistor (MOSFET), where the first end of the transistor T1 is the gate end, the second end of the transistor T1 is the source end, and the third end of the transistor T1 is the drain end. In this and some embodiments, the transistor T1 can be a N-type MOSFET or a bipolar junction transistor (BJT). The third resistor R3 has a first end and a second end, the first end of the third resistor R3 couples to the second end of the first resistor R1, and the second end of the third resistor R3 couples to the third end of the transistor T1.

In this and some embodiments, the chamber further includes an overvoltage protection unit 230 coupling between the second connection port 210 and the storage unit 220. The overvoltage protection unit 230 supplies a stable working voltage to the storage unit 220. The overvoltage protection unit 230 includes a voltage stabilizing diode D1, a capacitor C1 and a fourth resistor R4. The voltage stabilizing diode D1 has an anode and a cathode, the anode of the voltage stabilizing diode D1 is grounded, and the cathode of the voltage stabilizing diode D1 couples to the second connection port 210. The capacitor C1 has a first end and a second end, the first end of the capacitor C1 couples to the anode of the voltage stabilizing diode D1. The fourth resistor R4 has a first end and a second end, the first end of the fourth resistor R4 couples to the second end of the capacitor C1, and the second end of the fourth resistor R4 couples to the storage unit 220.

For example, when the connection state specifies that the first connection port 110 couples to the second connection port 210, a loop circuit is formed between the BMC 140 and the storage unit 220 and has a loop signal flowing within. Herein, the BMC 140 reads the data stored in the storage unit 220, to output the data signal to the display units 150 and 310 according to the loop signal. When the connection state specifies that the first connection port 110 does not couple to the second connection port 210, the BMC 140 outputs the warning signal to the alarm units 160 and 320. Thus, according to the data signal and the warning signal, users can know the location where the server 100 does not couple to the server cabinet 200, and can further deal with this error situation.

In this and some embodiments, the data stored in the storage unit 220 can include identification codes each of which specifies the location of the chamber of the server cabinet 200 containing the server 100, and the disclosure will not be limited thereby. The conversion unit 120 transmits the data signal or the warning signal through, for example, an internal integrated circuit (I2C) bus 122 to the BMC 140, and the disclosure will not be limited thereby.

Specifically, the server 100 in the server system 10 can output the data signal or the warning signal according to the determination result of the connection state between the server 100 and the server cabinet 200. In this way, users can in real time know whether the connection between the server 100 and the server cabinet 200 occurs an error or not.

As set forth above, the BMC in the server system detects the current connection state of the first connection port of the server in the server system, so as to output the data signal or the warning signal. If the first connection port couples to the second connection port of the server cabinet in the server system, the BMC will read the data, stored in the storage unit of the server cabinet, according to the loop signal to output the data signal. Alternately, if the first connection port does not couple to the second connection port, the BMC will output the warning signal. In this way, the connection state of the server may be detected more efficiently, and the efficiency of the server may be increased.

What is claimed is:

1. A server system, comprising:
   at least one server, comprising:
   a first connection port;
   a baseboard management controller, coupled to the first connection port and configured to detect a connection state of the first connection port, and outputting a data signal or a warning signal according to the connection state; and
   a conversion unit, coupled between the first connection port and the baseboard management controller; and
   a server cabinet, comprising a plurality of chambers for containing the at least one server, wherein each of the chambers comprises:
   a second connection port; and
   a storage unit, coupled to the second connection port and configured to store data;
   wherein when the connection state specifies that the first connection port couples to the second connection port, a circuit loop is formed between the baseboard management controller and the storage unit and has a loop signal flowing therein and the baseboard management controller reads the data stored in the storage unit to output the data signal according to the loop signal; and when the connection state specifies that the first connection port does not couple to the second connection port, the baseboard management controller outputs the warning signal; and
   wherein the conversion unit is configured to perform signal matching between the baseboard management controller and the storage unit.

2. The server system according to claim 1, wherein the at least one server further comprises:
   a display unit, coupled to the baseboard management controller and configured to receive and display the data signal; and
   an alarm unit, coupled to the baseboard management controller and configured to receive the warning signal and then output an alarm.

3. The server system according to claim 1, wherein via a network interface of the baseboard management controller the server system connects to a user end comprising:
   a display unit, coupled to the network interface and configured to receive and display the data signal; and
   an alarm unit, coupled to the network interface and configured to receive the warning signal and then output an alarm.

4. The server system according to claim 1, wherein the conversion unit transmits the data signal or the warning signal through an internal integrated circuit bus.

5. The server system according to claim 1, wherein the at least one server further comprises:
   a driving unit, coupled between the first connection port and the conversion unit and configured to receive a driving signal outputted by the conversion unit, and according to the driving signal output a current signal to power the storage unit.

6. The server system according to claim 5, wherein the driving unit comprises:
- a first resistor having a first end and a second end, the first end of the first resistor being supplied with a voltage, and the second end of the first resistor coupling to the conversion unit;
- a second resistor having a first end and a second end, and the first end of the second resistor being supplied with the voltage;
- a transistor having a first end, a second end and a third end, the first end of the transistor coupling to the conversion unit, the second end of the transistor coupling to the second end of the second resistor, and the third end of the transistor coupling to the first connection port; and
- a third resistor having a first end and a second end, the first end of the third resistor coupling to the second end of the first resistor, and the second end of the third resistor coupling to the third end of the transistor.

7. The server system according to claim 1, wherein each of the chambers further comprises:
- an overvoltage protection unit, coupled between the second connection port and the storage unit and configured to supply a stable working voltage to the storage unit.

8. The server system according to claim 7, wherein the overvoltage protection unit comprises:
- a voltage stabilizing diode having an anode and a cathode, the anode of the voltage stabilizing diode being grounded, and the cathode of the voltage stabilizing diode coupling to the second connection port;
- a capacitor having a first end and a second end, and the first end of the capacitor coupling to the anode of the voltage stabilizing diode; and
- a fourth resistor having a first end and a second end, the first end of the fourth resistor coupling to the second end of the capacitor, and the second end of the fourth resistor coupling to the storage unit.

9. The server system according to claim 1, wherein the storage unit is an erasable programmable read only memory.

* * * * *